June 5, 1934.  G. M. MAIER  1,961,231
HOT WATER HEATING APPARATUS
Filed March 31, 1931   2 Sheets-Sheet 1
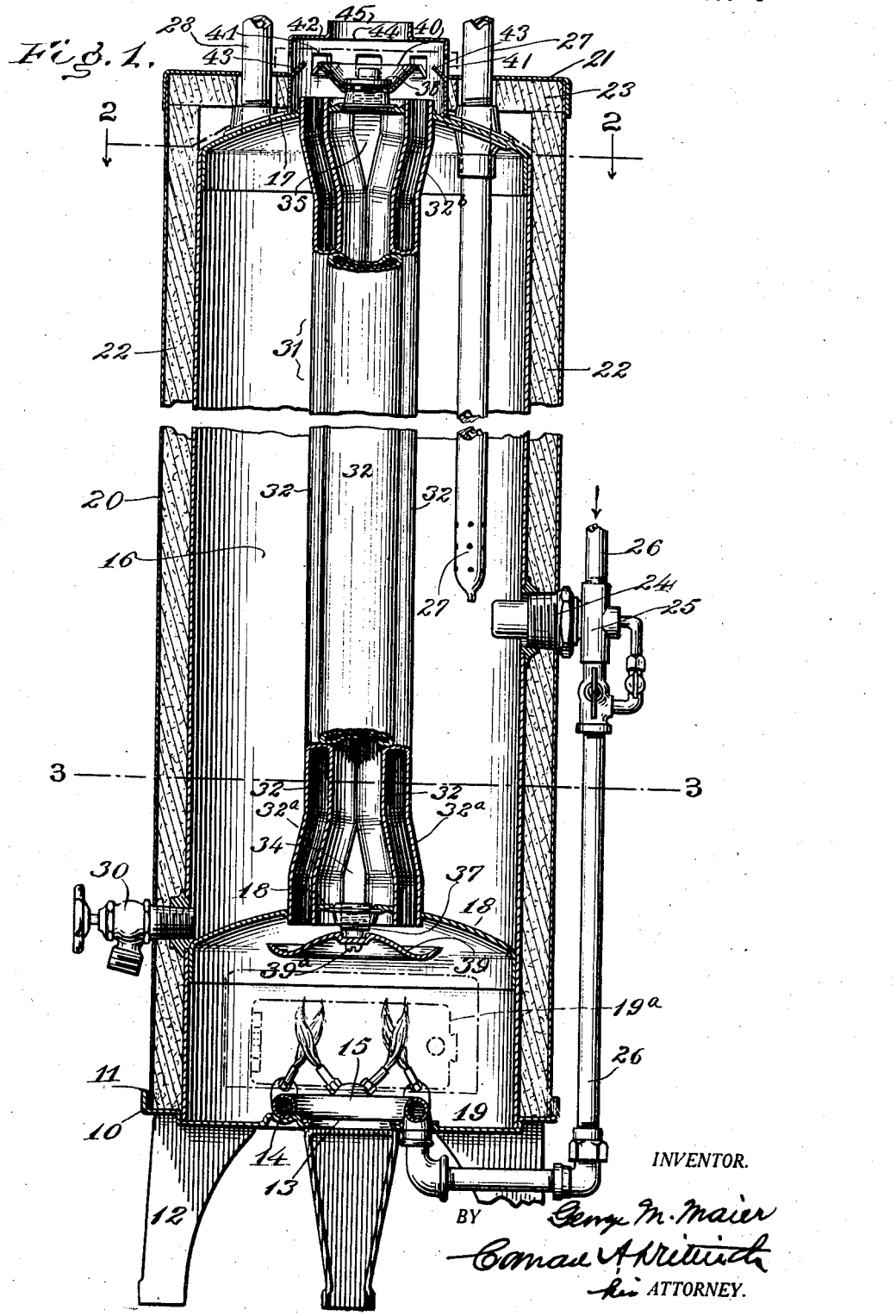

June 5, 1934.  G. M. MAIER  1,961,231
HOT WATER HEATING APPARATUS
Filed March 31, 1931  2 Sheets-Sheet 2
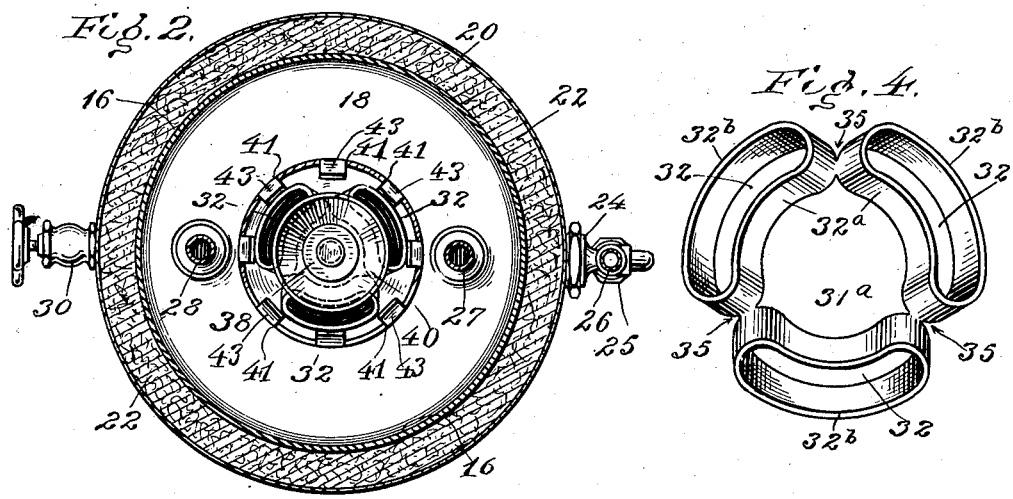
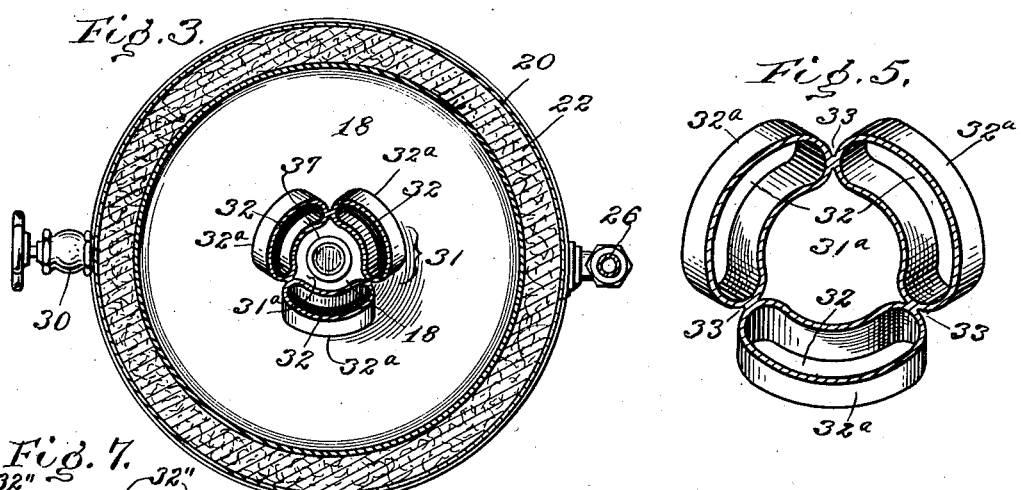
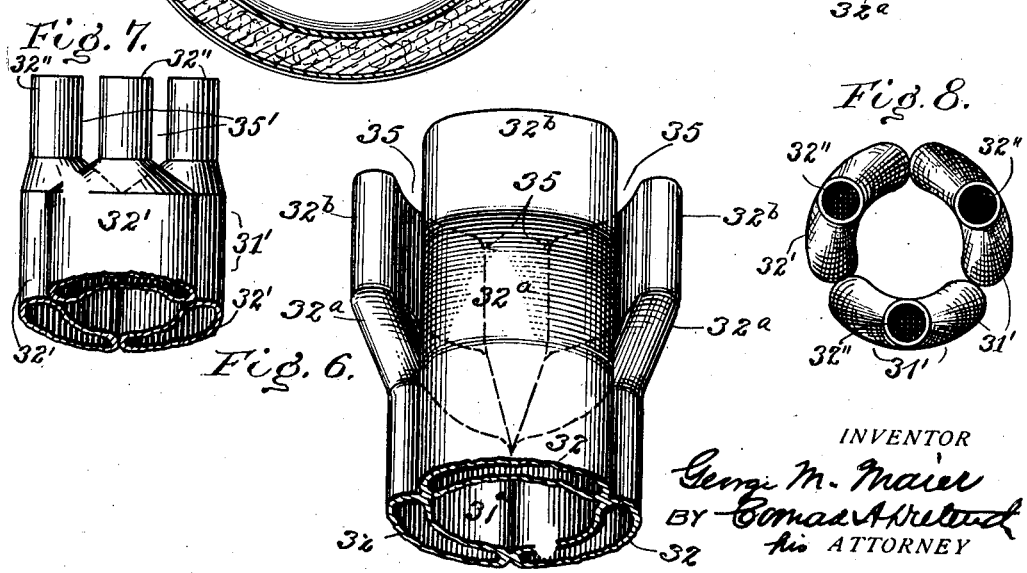
INVENTOR
George M. Maier
BY Conrad A. Wrelord
his ATTORNEY Patented June 5, 1934

1,961,231

UNITED STATES PATENT OFFICE 1,961,231

HOT WATER HEATING APPARATUS

George M. Maier, Pelham, N. Y., assignor to American Radiator Company, New York, N. Y., a corporation of New Jersey Application March 31, 1931, Serial No. 526,611

15 Claims. (Cl. 122—17)

My invention relates to improvements in hot water heating apparatus, and the same has for its object to provide an apparatus which is simple in construction, efficient in operation and comparatively inexpensive to manufacture.

Further, said invention has for its object to provide an apparatus in which the transfer of heat is quickly effected, and the water effectively circulated in order to heat rapidly the entire mass of water in the container or tank.

Further, said invention has for its object to provide an apparatus in which the water to be heated is caused to pass through a tubular flue having a plurality of inlets and outlets, and having a double enclosing wall formed by a plurality of separate or independent passages for the hot gases and products of combustion.

Further, said invention has for its object to provide an apparatus in which the water to be heated is caused to pass through a tubular flue or duct having a substantially continuous hollow annular wall through which the hot gases and products of combustion are caused to pass in a plurality of separated streams.

Further, said invention has for its object to provide an apparatus in which the hot gas and products of combustion used to heat the water are caused to pass through a plurality of tubes in each of which the external surface per unit of length is large compared to the cross sectional area of the interior of the tube so that a thin column or mass of hot gases is maintained in contact with the relatively large inner surfaces of the tubes.

Further, said invention has for its object to provide an apparatus in which the hot gases and products of combustion are caused to pass through a plurality of tubes of relatively small cross-sectional area and having off-set intake and outlet portions serving to crowd said gases into intimate contact with the inner surfaces of said tubes and to retard the same sufficiently in their passage through said tubes in order to effect substantially the full transfer of heat from said gases to the surrounding water.

Further, said invention has for its object to provide an apparatus in which the hot gases and products of combustion are caused to pass through a plurality of segmental tubes jointly forming the enclosing wall of a central flue for the passage of the enclosed water therethrough, and in which the enclosed column of water is caused to pass into and out of said central flue through a plurality of separate inlet and outlet openings whose combined area is such as to cause a rate of flow which will insure the most efficient circulation of the entire water mass, and to effect substantially the complete transfer of heat to the water.

Further, said invention has for its object to provide an apparatus in which the hot gases and products of combustion emanating from the combustion chamber will be uniformly distributed before entering the water heating flues, and in which any back-drafts or air currents entering the upper end of the apparatus will be so deflected or diverted as to prevent the same entering the upper or discharge ends of said heating flues and causing the extinguishing of the gas burners, or otherwise interfering with the due operation thereof.

Other objects will in part be obvious and in part be pointed out hereinafter.

To the attainment of the aforesaid objects and ends, my invention consists in the novel features of construction, and in the combination, connection and arrangement of parts hereinafter more fully described and then pointed out in the claims.

In the accompanying drawings forming part of this specification,

Figure 1 is a central, vertical section showing one form of hot water heater constructed according to, and embodying my said invention;

Fig. 2 is a transverse section on the line 2—2 of Fig. 1;

Fig. 3 is a similar section on the line 3—3 of Fig. 1;

Fig. 4 is an enlarged detail top view of the flue forming the gas and water passage;

Fig. 5 is a view similar to Fig. 4 but in section taken essentially on the line 3—3 of Fig. 1;

Fig. 6 is an enlarged detail perspective view showing the upper end of the gas and water flue, and showing the arrangement of the water outlets and the gas outlets thereof;

Fig. 7 is a detail side elevation showing the upper end of a modified form of gas and water flue, and Fig. 8 is a top view thereof.

In said drawings 10 designates a circular recessed base having a peripheral flange 11, and legs 12 for supporting the same in raised position. The base 10 is provided with a central opening 13, and surrounding said opening with an annular recess or groove 14 to receive and support a burner 15.

16 denotes a cylindrical water receptacle or tank having a convex head or top 17, and a concave bottom 18 secured within the lower end of the receptacle 16 inwardly of its lower edge so as to form a combustion chamber 19 within which said burner 15 is located. In the front of the combustion chamber 19 is an opening provided with a door 19ª to allow access to the interior of said chamber, the burner, and other parts therein.

The sides and top of the water receptacle or tank 16 are enclosed by a cylindrical metal jacket 20, and a top 21, respectively, and between the outer sides of said tank 16 and said metal jacket members are interposed insulating lining members 22, 23.

In one side of the tank 16 is provided a thermostatic control 24 acting upon a valve 25 in the gas supply pipe 26 leading from a source of gas supply to the burner 15 whereby the supply of gas to the burner is controlled in accordance with the temperature changes of the water in the tank 16.

27 denotes a water supply pipe extending into the tank through the top 17 thereof, and 28 a hot water outlet pipe secured in said top 17. At one side of the tank adjacent the bottom is provided a drain cock 30.

Arranged centrally within the tank 16 is a flue 31 comprising a central water-way 31ª enclosed by a series of heating flues formed of a plurality of relatively flat, curved or segmental tube members 32, (in the present instance three being used) having their adjacent smaller vertical sides or edges in contact and secured together by soldering, welding, or by any convenient mechanical or other means at 33 to form the tubular flue 31. The opposite ends 32ª of said tube members 32 are free along their vertical edges, and are bent outwardly at a slight angle, and have their extreme ends 32ᵇ then turned inwardly again parallel with the longitudinal axis of the flue so as to form three substantially V-shaped inlet and outlet openings 34, 35, respectively, for the inflow and outflow of the water to and from the central portion or water-way 31ª of the flue 31 and from and to the tank 16.

The separated upper and lower ends 32ᵇ of the tube members 32 extend a short distance through the head 17, and the bottom 18, respectively, and are soldered, welded or otherwise secured thereto in fluid-tight relation.

The under side of the bottom 18, within the lower ends of the tube members 32, is provided with a threaded opening to receive a screw plug 37, and the top 17 is similarly provided with an aperture to receive a screw plug 38, which plugs are designed to be removed to permit of the insertion of a suitable brush or scraping device for cleaning of the interior of the flue 31 when that becomes desirable or necessary.

39 denotes a combined heat deflecting plate and condensation drip pan secured to the underside of the screw plug 35 and in spaced relation thereto by a screw 39ª. The said deflecting plate is of concavo-convex form, and circular in outline; the diameter thereof being somewhat greater than the diameter of the expanded lower end of the flue 31, and serves to deflect and spread the heat from the burner 15, and to collect and evaporate any condensation which may result from the cooling of the gases in their passage through said tube members 32.

40 denotes a back-draft deflecting plate which is hollow, and of truncated cone form. The said plate is secured centrally to the upper side of the screw plug 38 in the top 17. The diameter of the widest part of said deflector 40 is somewhat less than that of the expanded upper end of the flue 31, and it cooperates with an annular series of rectangular apertures 41 in a hood 42 extending centrally from the jacket top 21 in deflecting or diverting any back-drafts or air currents entering the flue opening in the top 21, and from passing downwardly into the upper ends of the tube members or elements 32 and thereby cause the extinguishing of the flames of the gas burner 15 or otherwise interfere with the due operation thereof. Each aperture 41 is provided at its lower edge with an inwardly struck-up deflecting tongue 42 whose upper edge terminates near and in the same horizontal plane with the upper edge of the back-draft deflector 40. The hood 42 is provided with an outlet opening or discharge 44 in its top having an upwardly extending flange 45 to receive one end of a pipe whose other end may be connected to a suitable stack or flue discharging into the outside atmosphere.

In the modification illustrated at Figs. 7 and 8, the flue proper 31' is constructed essentially as hereinabove described. In the present instance the plurality of segmental tube members 32' have reduced ends 32'' which are cylindrical or substantially cylindrical in cross-section, and of less width than the body of the tube members 32' so as to provide spaces 35' between said reduced ends forming inlet and outlet passages for the water.

The operation of the apparatus will be largely obvious from the foregoing description. It need merely be noted that by reason of the novel form of the water and gas flues a higher efficiency is obtained than has heretofore been possible, and that this increased efficiency is due in part to the fact that the relatively small volume of water within the flue is subject to contact with the relatively large heated surfaces of a plurality of separate gas flues arranged side by side in close contact and forming a double walled flue for the water way. Further, the water in the tank is additionally heated by the contact thereof with the outer surfaces of the gas tubes.

Further, it is to be noted that by making the individual gas tubes in the form herein shown and described a tube is obtained having the same external surface per unit of length as a round tube of equal perimeter, while the cross-sectional area thereof is only about one-half to about one-third of that of such round tube, thus practically the entire column of gas passing through each tube is brought into intimate contact with the inside walls thereof, and the more efficient transfer of heat to the water effected.

Further, by so proportioning the cross-sectional area of the gas tubes to the cross-sectional area of the central water tube and providing the latter with a plurality of duly proportioned inlet and outlet openings, the most efficient heating and travel of the water through the water tube is obtained, and the most efficient rate of circulation between the water in the tank and that within the tube is provided thus insuring the rapid and thorough heating to the desired degree of the entire mass of water in the tank.

Having thus described my said invention, what I claim and desire to secure by Letters Patent is:

1. An apparatus of the character described including a container for the liquid to be heated, and a flue extending through said container comprising a double-walled tubular member having a central water-way communicating with the interior of said container; said tubular member including a plurality of tubes having their longitudinal edges in contact and jointly forming a series of separate heating flues communicating with a source of heat supply and enclosing said central water-way, substantially as specified.

2. An apparatus of the character described including a container for the liquid to be heated, a combustion chamber below said container, and a flue extending through said container comprising a double walled tubular member having a central water-way communicating with the interior of said container; said tubular member including a plurality of tubes having their longitudinal edges in contact and jointly forming a series of separate heating flues communicating with said combustion chamber and enclosing said central water-way, substantially as specified.

3. An apparatus of the character described including a container for the liquid to be heated, a combustion chamber below said container and a flue extending through said container comprising a double-walled tubular member having a central water-way communicating with the interior of said container; said tubular member including a plurality of tubes of segmental form in cross-section having their longitudinal edges in contact and jointly forming a series of separate parallel heating flues communicating with said combustion chamber an enclosing said central water-way, substantially as specified.

4. An apparatus of the character described including a container for the liquid to be heated, a combustion chamber below said container, and a flue extending through said container comprising a double-walled tubular member having a central water-way; said tubular member including a plurality of tubes having their longitudinal edges in contact and jointly forming a series of separate heating flues communicating with a source of heat supply and enclosing said central water-way; said tubes having their upper and lower ends spaced apart and forming inlet and outlet openings providing communication between said central water-way and the interior of said container, substantially as specified.

5. An apparatus of the character described including a container for the liquid to be heated, a combustion chamber below said container, and a flue extending through said container comprising a double-walled tubular member having a central water-way; said tubular member including a plurality of tubes having intermediate portions of their longitudinal edges in contact and jointly forming a series of separate heating flues communicating with a source of heat supply and enclosing said central water-way; said tubes having their upper and lower free ends offset and spaced apart and forming inlet and outlet openings providing communication between said central water-way and the interior of said container, substantially as specified.

6. An apparatus of the character described including a container for the liquid to be heated, a combustion chamber below said container, and a flue extending through said container comprising a double-walled tubular member having its interior forming a water-way communicating with the interior of said container; said double-walled member comprising a series of separate, hollow, longitudinal elements arranged side by side in close contact, each of said hollow elements communicating at one end with said combustion chamber and having its other end extending through the top of said container, substantially as specified.

7. An apparatus of the character described including a container for the liquid to be heated, a combustion chamber below said container, and a flue extending through said container comprising a double-walled tubular member having its interior forming a water-way, inlet and outlet openings adjacent the lower and upper ends of said flue communicating with the interior of said container; said double-walled member comprising a series of separate, longitudinal tubular elements of segmental form in cross-section with their narrower longitudinal sides in contact, each of said elements communicating at one end with said combustion chamber and having its other end extending through the top of said container, substantially as specified.

8. An apparatus of the character described including a container for the liquid to be heated, a combustion chamber below said container, and a flue comprising a double-walled tubular member having its interior wall forming a water-way; said double-walled member comprising a series of separate parallel tubular elements having the major portions of their longitudinal edges in contact and their lower and upper ends spaced apart to form inlet and outlet passages therebetween connecting the water-way of said flue with the interior of said container, and said tubular elements each communicating at one end with said combustion chamber and having its other end extending through the top of said container, substantially as specified.

9. An apparatus of the character described including a container for the liquid to be heated, a combustion chamber below said container, and a flue extending through said container comprising a double-walled tubular member having a central water-way; said double-walled member comprising a series of separate tubular elements of segmental form in cross-section with their narrower longitudinal sides in contact, and their opposite ends offset and spaced apart to form inlet and outlet passages therebetween establishing communication between the water-way of said flue and the interior of said container, and said tubular elements each communicating at one end with said combustion chamber and having its other end extending through the top of said container, substantially as specified.

10. In an apparatus of the character described including a container for the liquid to be heated, a combustion chamber below said container, and a flue comprising a double-walled tubular member having its interior wall forming a water-way; said double-walled member comprising a series of separate tubular elements arranged side by side with their longitudinal edges in contact and having their opposite ends spaced apart and extending through the bottom and top of said container and secured thereto in fluid-relation, the spaces between the portions of said elements located within said container forming inlet and outlet passages providing communication between the water-way of said flue and the interior of said container, substantially as specified.

11. In an apparatus of the character described including a container for the liquid to be heated, a combustion chamber below said container, and a flue comprising a double walled tubular member having its interior wall forming a water-way; said double-walled member comprising a series of separate tubular elements arranged side by side with their longitudinal edges in contact and having their opposite ends spaced apart and extending through the bottom and top of said container and secured thereto in fluid-tight relation, the spaces between the portions of said elements located within said container forming inlet and outlet passages providing communication between the water-way of said flue and the interior of said container, and the lower ends of said tubular elements communicating with said combustion chamber, substantially as specified.

12. In an apparatus of the character described a container for the liquid to be heated, a combustion chamber below said container, a double-walled heating flue including a central water-way disposed within said container and having its ends extending to the top and bottom thereof; said top and bottom having openings registering with the water-way of said flue, removable closures for said openings, a heat deflector secured to one of said removable closures, and a back-draft deflector secured to the other of said closures, substantially as specified.

13. An apparatus of the character described including a container for the liquid to be heated, a combustion chamber below said container, and a flue extending through said container comprising a double-walled tubular member having its interior forming a water-way; said double-walled member comprising a series of separate, hollow longitudinal elements arranged side by side in close contact, and a reduced tubular portion at each end of each hollow element forming with the corresponding tubular portions of the other of said hollow elements spaces serving as passages connecting the interior of said flue with the interior of said container, substantially as specified.

14. In an apparatus of the character described a container for the liquid to be heated, a combustion chamber below said container, a double-walled heating flue including a central water-way disposed within said container and having its ends extending to the top and bottom thereof; said top and bottom having screw-threaded openings in line with the water-way of said flue, screw-plugs for sealing said openings, a heat deflector disposed within said combustion chamber and secured to the screw-plug for sealing the opening in said bottom, and a back-draft deflector comprising a hollow body having upwardly flaring sides and secured at its base to the screw plug for sealing the opening in the top of said container, substantially as specified.

15. An apparatus of the character described, including a container for the liquid to be heated, and a flue extending through said container comprising a double-walled tubular member having a central water-way and a plurality of independent, longitudinal passages arranged between the inner and outer walls of said flue and surrounding said central water-way and severally communicating with a source of heat supply, substantially as specified.

GEORGE M. MAIER.